Patented July 22, 1930

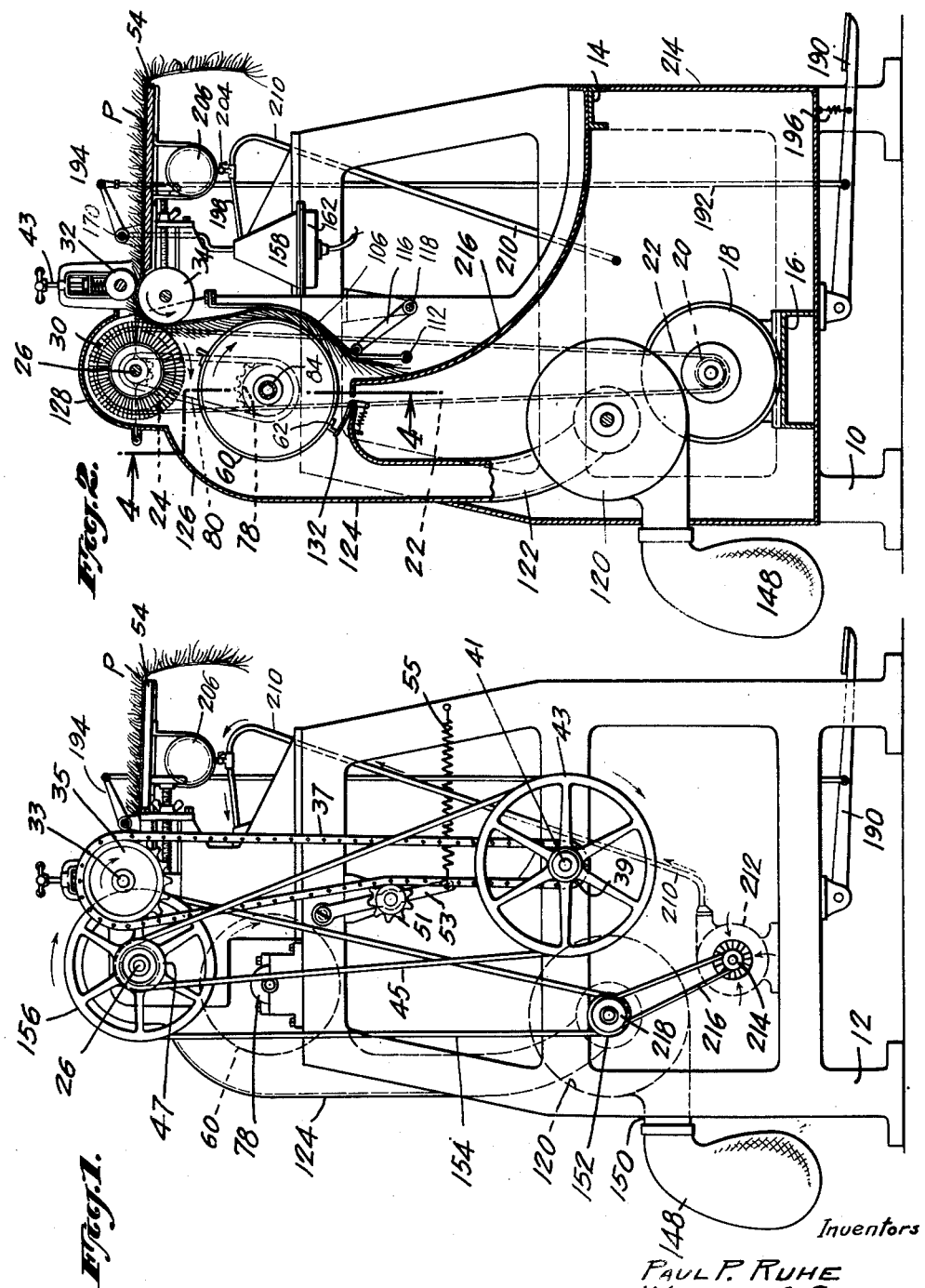

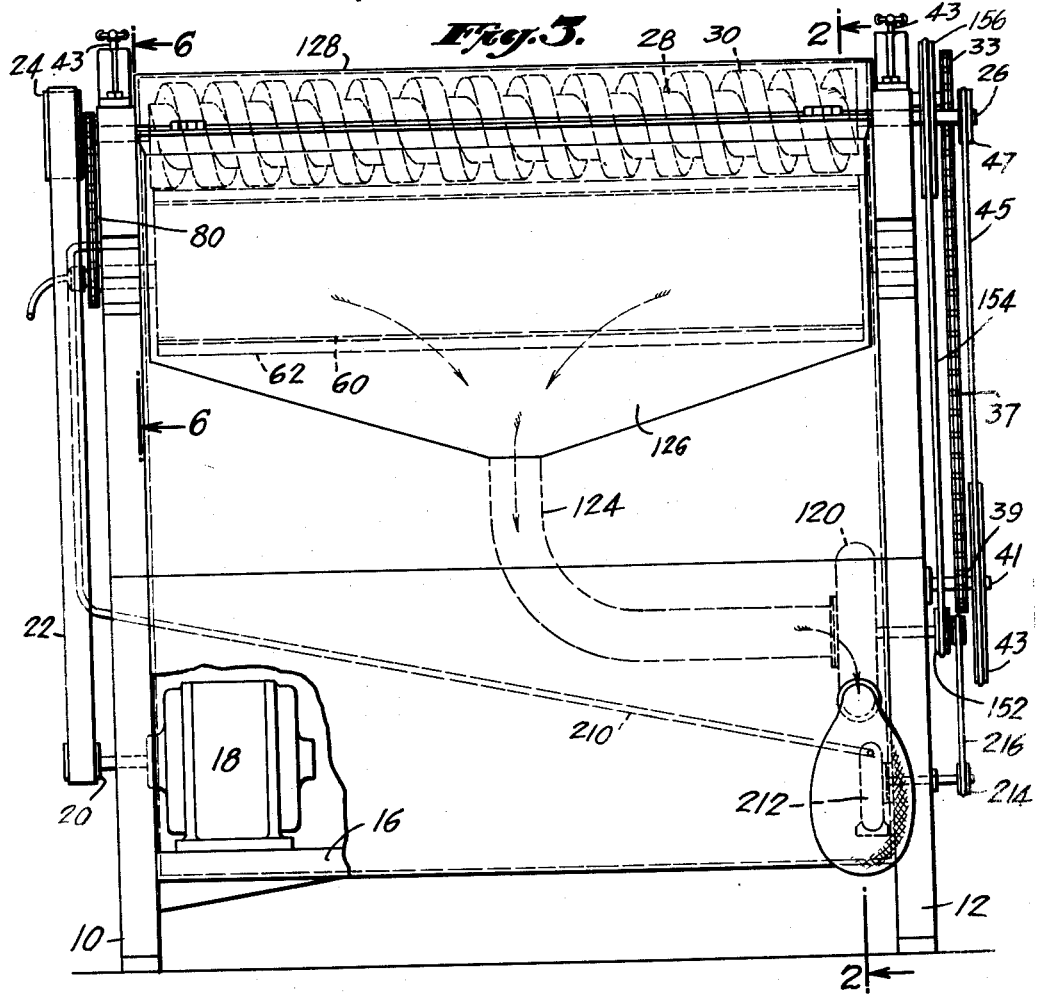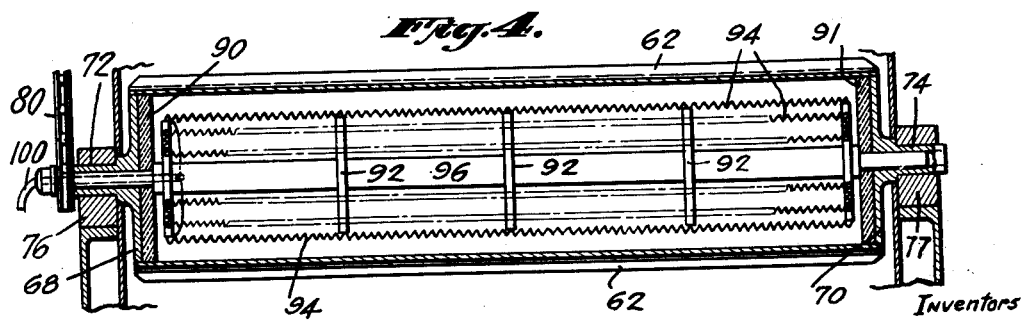

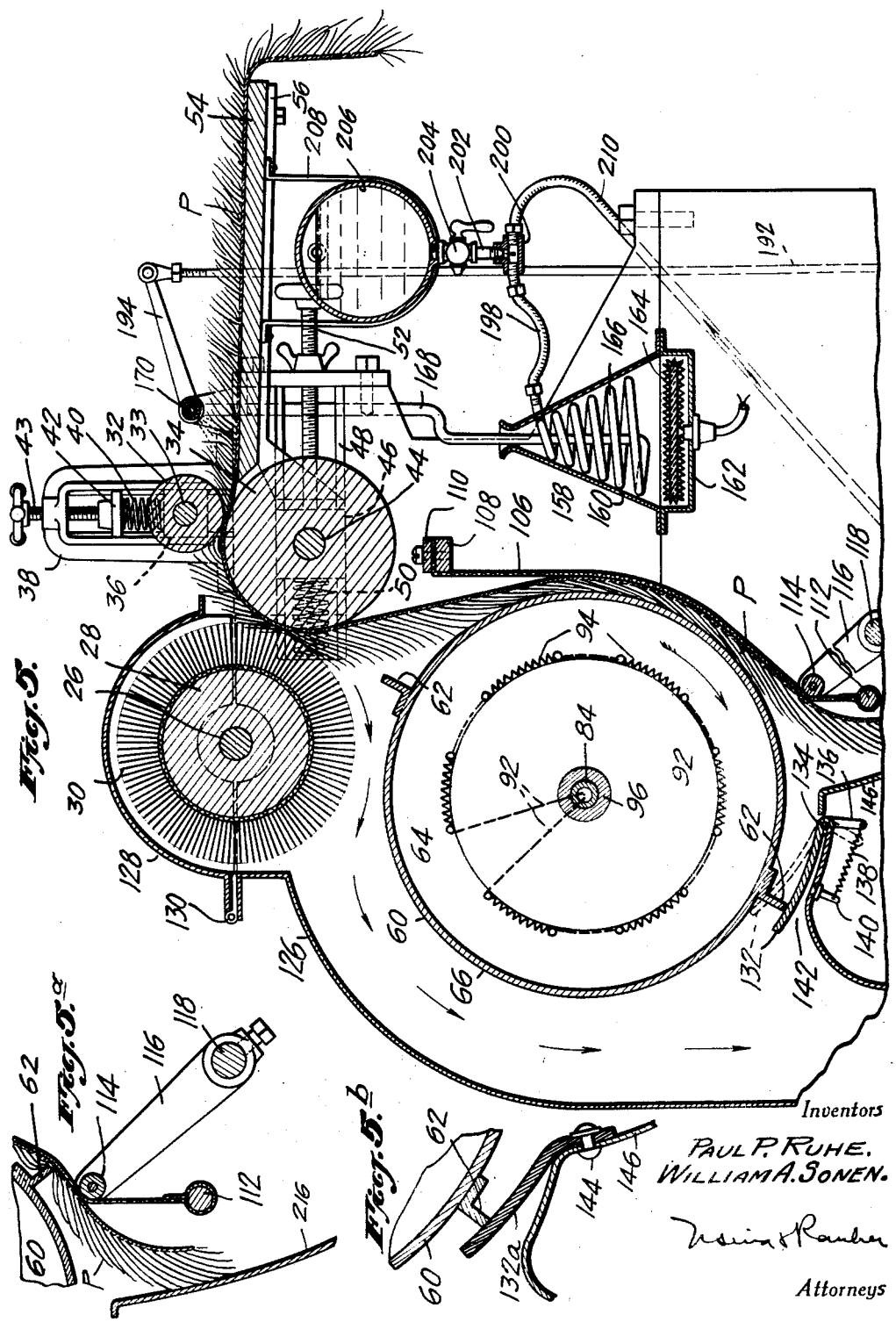

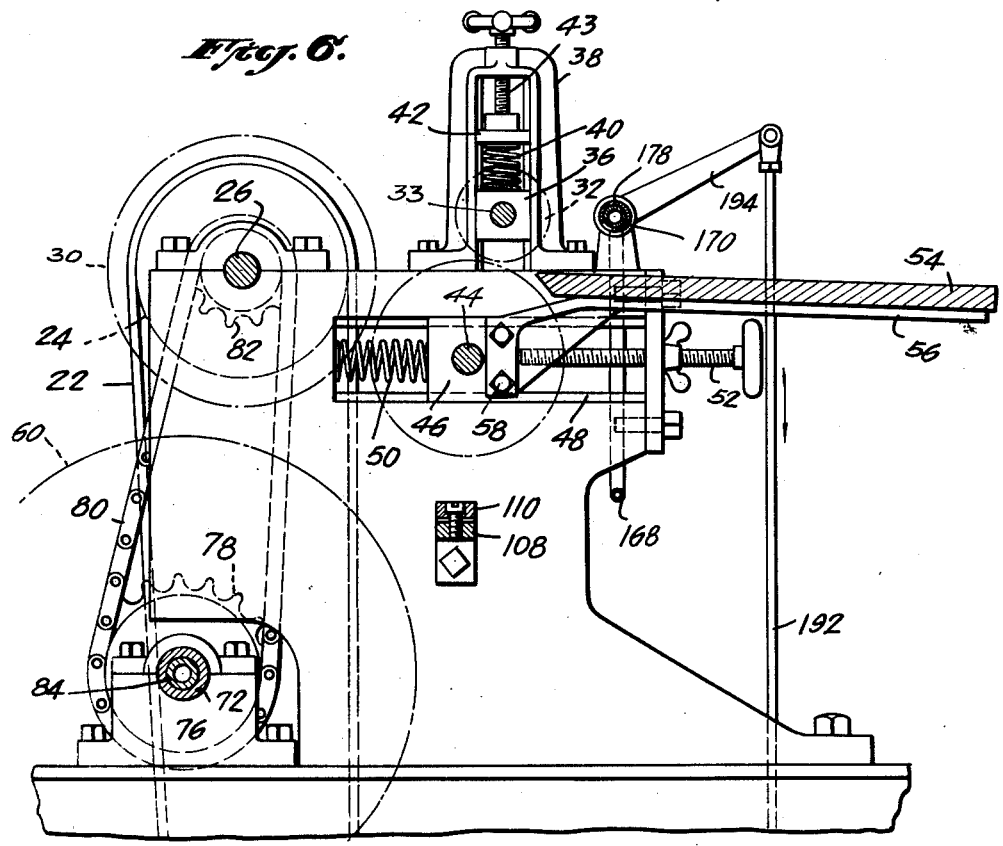
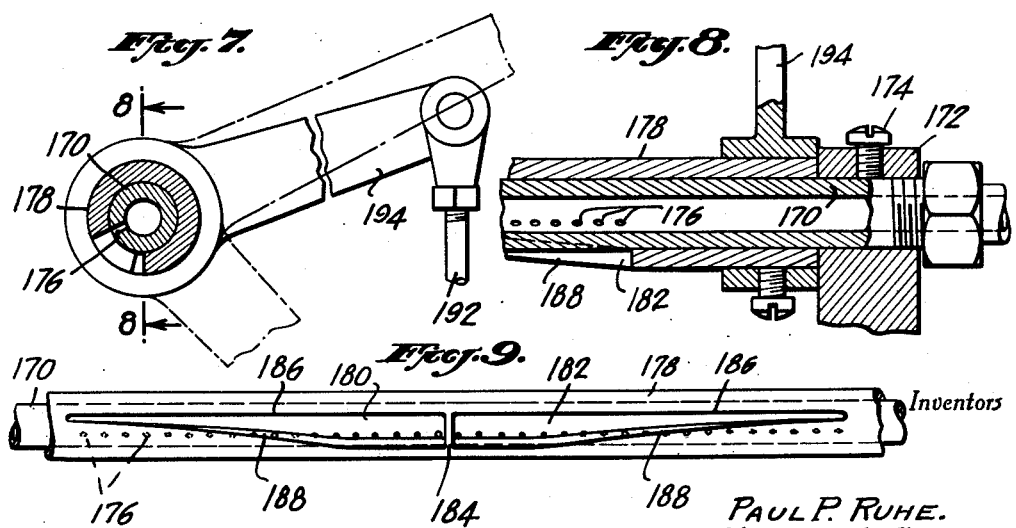

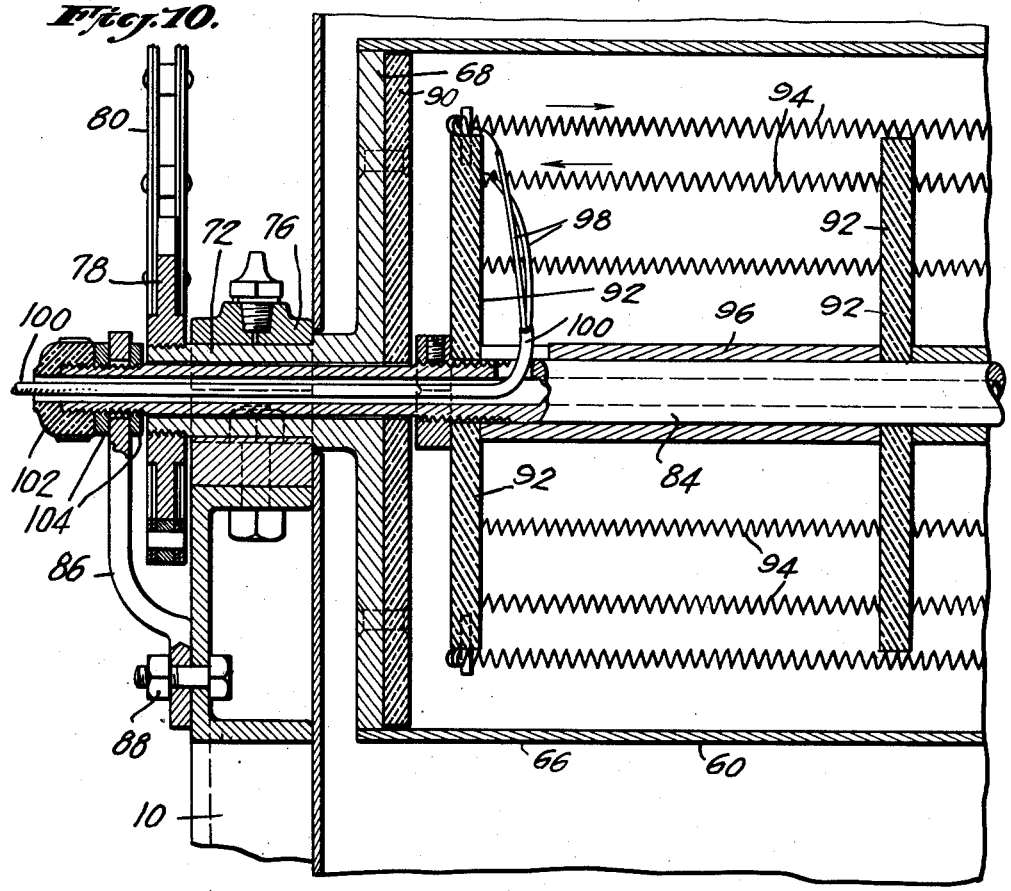

1,771,144

UNITED STATES PATENT OFFICE

PAUL P. RUHE, OF WOODCLIFF, NEW JERSEY, AND WILLIAM A. SONEN, OF BRONX, NEW YORK

FUR-TREATING MACHINE

Application filed July 20, 1929. Serial No. 379,719.

This invention relates to machines for treating fur pelts and aims to provide improved means for applying vapor to such pelts and subsequently combing them, heating or ironing them and beating or fluffing the same.

In the embodiment of the invention illustrated, we have incorporated an improved means for applying vapor, which is adapted to soften and moisten the pelt prior to combing. We also include a combined heater and beater, which is operative after the pelt has been combed or brushed. The machine shown includes improved means for yieldingly pressing a large area of the pelt in contact with a rotary heater or ironer, the yielding member being adapted to move away from the drum under the influence of beaters carried by the heating member. The machine also incorporates a suction device for carrying away foreign matter combed out of the fur, this suction device being connected with a casing. Yielding means are provided for closing the space between the casing and the rotary heating device.

These and various other features of the invention will be fully apparent from the following specification when read in connection with the accompanying drawings and such novel features will be pointed out with particularity in the appended claims. In the drawings:—

Fig. 1 is a side elevation of a machine embodying our invention. The view being taken from the left of Fig. 3;

Fig. 2 is a transverse section on line 2—2 of Fig. 3;

Fig. 3 is a rear elevation of the machine as viewed from the left hand side of Figs. 1 and 2;

Fig. 4 is a longitudinal section through our combined heater and beater, the view being a section on line 4—4 of Fig. 2;

Fig. 5 is an enlarged detail of the upper portion of Fig. 2;

Fig. 5ª is a fragmentary view illustrating a different position of certain parts shown in Fig. 5;

Fig. 5ᵇ is a fragmentary view illustrating a modification of parts shown in Fig. 5;

Fig. 6 is an enlarged detail taken approximately on line 6—6 of Fig. 3;

Fig. 7 is a detail view of means for distributing vapor over a pelt;

Fig. 8 is a longitudinal section on line 8—8 of Fig. 7;

Fig. 9 is a view of a portion of the distributor as viewed from the left of Fig. 7;

Fig. 10 is an enlarged sectional detail of the left end of the heater shown in Fig. 4.

Referring in detail to the drawings, the machine includes side frames 10 and 12 connected by cross members 14 and 16. A motor 18 carried by the cross member 16 carries a pulley 20 around which passes a belt 22. This belt engages a pulley 24 carried by a shaft 26 to which is secured a roller 28 carrying a multiplicity of bristles 30 arranged in a helical manner, as indicated in Fig. 3. The roller 28 and the bristles carried thereby constitute a brushing or combing roller adapted to cleanse the pelt P under treatment.

The pelt is fed into position for engagement with the brushing or combing roller 28 by means of coacting feed rollers 32 and 34. The roller 32 is carried in the bearings 36 slidable in brackets 38 and springs 40 tend to normally press the roller 32 toward the roller 34, the springs reacting against adjustable stops 42, which are arranged to be adjusted by a feed screw 43.

The roller 34 is carried by a shaft 44 mounted at each end in a bearing block 46 slidable in a guide 48. The feed roller 32 is carried by a shaft 33 to one end of which is secured a sprocket wheel 35, which is driven through a chain 37 and a sprocket 39 carried on a stub shaft 41. This stub shaft carries a pulley 43, which is driven by a belt 45, which engages a pulley 47 secured to the outer end of the brush roller shaft 26.

For taking up slack in the chain 47 we provide a sprocket 51 carried on an arm 53, which is pulled in the proper direction by a spring 55. This arrangement permits of vertical adjustment of the sprocket 35 without interfering with the drive.

A spring 50 tends to press each bearing block 46 away from the brush roller and a screw 52 is provided for pressing the bearing block and roller 34 toward the brushing roll. A pelt supporting feed table 54 is secured near each end to a bracket 56 which is fastened by bolts 58 to the bearing block 46. The arrangement is such that the feed table 54 moves with the feed roller 34. This permits relative adjustment between the feed roller 34 and the brushing roller 28 so as to take care of pelts or furs of different thickness and which also provides a convenient arrangement for withdrawing the feed roller 34 in the event that a pelt becomes wedged or stuck in the machine.

A combined heating and beating drum, indicated as a whole at 60, is arranged to act on the fur after the same has been brushed or combed by the bristles 30 on the roller 28. This member 60 is in the form of a substantially cylindrical drum of hollow construction and on its exterior it carries a plurality of beaters 62. The drum 60 is rotatable by means hereinafter described and within its interior there is located a fixed heating element, indicated as a whole at 64. The drum 60, as shown, is in the form of a cylindrical shell 66 secured at its ends to heads 68 and 70. These heads are formed with journal portions 72 and 74, which are rotatable in bearings 76 and 77, the bearings being carried by the side frames of the machine. The journal portion 72, as illustrated in Fig. 10, carries a sprocket 78 by means of which the drum is rotated. This sprocket is driven by a chain 80, which passes over a sprocket 82 secured to the shaft 26 (see Figs. 2, 6 and 10).

The heating element in the drum 60 is supported by a pipe 84 which is secured to each end of a bracket as shown at 86 in Fig. 10, the bracket being secured by means of a bolt 88 to a fixed part of the side frame. The pipe 84 passes freely through a central longitudinal bore in the trunnion portions 72 and 74 of the heads 68 and 70. Inside the heads 68 and 70 are secured insulating discs 90 and 91 and between these discs are located a plurality of discs 92, which support resistance heating coils 94. The several discs 92 being spaced apart by sleeves 96 surrounding the pipe 84. The several heating coils 94 are electrically connected with one another and with current supply conductors 98—98 enclosed in an insulating conduit 100, which passes through the central opening of the pipe 84. The pipe 84 is clamped by means of nut 102 and nuts 104 to the fixed bracket 86 so that the heating element including the several coils 94 and supporting discs 92 carried by the pipe 84 remain stationary while the drum 66 revolves.

For yieldingly pressing a relatively large area of the pelt being treated into cooperative engagement with the heating and beating drum 60, we provide a blanket 106 preferably formed of flexible textile fabric such as canvas or the like. The upper end of this blanket is secured to a cross bar 108 by means of a clamp rod 110. At its lower end the blanket carries a rod 112. The blanket passes over a guide bar 114, which is secured to the free end of an arm 116 carried by an adjustable shaft 118.

The weight of the rod 112 is sufficient to exert a slight pressure on the fur pelt being treated, it being understood that the pelt passes between the blanket 106 and the drum 60. This arrangement permits both the blanket and the fur pelt to move outwardly as the beaters 62 come opposite the blanket. By partially rotating the shaft 118 it will be understood that various arcuate portions of the pelt being treated can be caused to cooperate with the drum. That is to say, the arc of contact of the fur treated can be varied at will.

For removing dust, dirt and other foreign matter after it has been brushed out of the pelt by the bristles of the roll 30, we provide a suction fan or exhauster 120 the suction end of which is connected to a conduit 122 leading to a casing 124 having a hood portion 126, which encloses a part of the heating drum 60. A supplemental casing 128 hinged at 130 also encloses the upper part of the brushing roll 28.

Yielding means are preferably provided for closing the space between the drum 60 and a portion of the casing. As shown in Fig. 5, this yielding means comprises a member 132 carried by a shaft 134 having an arm 136 connected with a spring 138, which is anchored at 140. The spring tends to press the member 132 to the dotted position. Thus air leakage between the drum and the restricted portion 142 of the casing is normally prevented. As the beaters 62 come opposite the member 132, said member merely swings on its pivot.

Instead of mounting the member 132 on the spring rotated shaft 134, we may provide a member 132$^a$ formed of rubber, leather or similar flexible material, which has sufficient inherent elasticity to move to and from engagement with the drum 60 as the beaters 62 pass by. This rubber or leather flapper may be secured by rivets 144 to a portion 146 of the casing as illustrated in Fig. 5$^b$.

The fan or exhauster 120 has a dust collecting bag 148 removably secured to the outlet point 50 thereof. The exhaust fan 120 carries a pulley 152, which is driven by a belt 154 from a pulley 156 secured to the shaft 26.

For properly preparing the fur pelt for treatment prior to the brushing and ironing operation effected by the roller 28 and the heated drum 60, we provide means for directing jets of vapor over the surface of the fur. This vapor distribution means is provided with an arrangement whereby the area of fur to which the vapor is applied can be varied at will. This permits of adjusting the vapor distribution for coaction with fur pelts of different widths. In the embodiment of the invention illustrated this vapor distribution equipment includes a vaporizer indicated as a whole at 158. This vaporizer is in the form of a substantially conical casing 160 having a shallow, hollow base 162 carrying an electric heating element 164. Above the heating element there is a pipe coil 166 having one end 168 which leads to a distribution pipe 170 (Figs. 7 and 8).

The pipe 170 is supported at each end in a fixed bearing 172 by means of a suitable set screw 174. The pipe has a number of outlet orifices 176 arranged in a longitudinal row. Surrounding the pipe 170 is a sleeve 178 formed with slots 180 and 182 separated by a central web 184. The slots 180 and 182 are bounded by converging edges 186 and 188, the edges 186 being substantially parallel with the axis of the pipe 70 while the edges 188 are disposed obliquely as indicated in Fig. 9. As thus arranged it is clear that by turning the sleeve 178 relatively to the pipe 180 the orifices 176 will be progressively uncovered. In this manner the operator can adjust the vapor distributor so that it will serve furs of different widths. The sleeve 178 is manipulated by means of a foot treadle 190, which is connected by a link 192 with an arm 194 secured thereto. A spring 196 is connected to the treadle 190 and normally tends to turn the sleeve in the proper direction to open the orifices. The operator holds his foot against the treadle while the fur is being fed under the distributor and is thus able to manipulate the distributor so as to take care of the varying widths of the pelt as it is fed through the feed rollers. This is important as it eliminates waste.

The upper end of the vaporizer coil 166 is connected by means of a flexible tube 198 with a fitting 200, which communicates through a nipple 202 and normally open valve 204 with a supply tank 206 supported at each end by a suitable hanger 208 secured to the underside of the feed table 54.

Also connected to the fittting 200 is a piece of flexible tubing 210, which leads to a small blower 212 mounted on a suitable fixed support and driven through a pulley 214 and belt 216 by a pulley 218 carried on the same shaft, which supports the exhaust fan pulley 152.

The tank 206 is provided with a suitable filling spout and vent not shown. Normally the tank may be filled or partially filled either with water or a special glazing fluid. This fluid will pass drop by drop (due to the settting of valve 204) into the fitting 200. Here each drop will be struck by a blast of air from the fan or blower 212. This will force a small quantity of water or glazing fluid through the several convolutions of the vaporizer coil 166. The heating element 164 will then vaporize the liquid and the air blast will carry the vapor through pipe 168 to the distributing pipe, which extends transversely across the top of the feed table on which the pelt is fed to the feed rollers.

The exhauster 120 and the blower 212 are preferably enclosed by a casing 214. The machine is also provided with a grooved transversely extending apron 216 (Fig. 2) upon which the finished fur is discharged.

In the operation of the device, the pelt P is passed below the vapor distribution pipe 170 whereupon the operator depresses the treadle 190 a sufficient extent to cause jets of vapor to strike all portions of the pelt. As shown in the drawings, the hair-side of the pelt is uppermost. The vapor striking the hair-side of the pelt tends to slightly heat the fur and to moisten and soften it. The thus moistened and softened pelt is engaged with the feed rollers 32 and 34, which carry it forward into coaction with the bristles on the brushing or combing roller 30. This roller brushes out any dust particles or other foreign matter and serves to smooth the hair-like texture of the pelt so that all hairs extend in a substantially uniform direction. As the pelt progresses through the machine, it is next acted upon by the heated drum 60 and the beaters carried thereby. During this part of the operation the flexible blanket yieldingly presses the pelt in contact with the cylindrical part of the drum so that a very effective so-called ironing operation is secured. This smoothes out the hair-like parts of the pelt and imparts a desirable glazed finish thereto. During the time the pelt coacts with the drum 60 the beaters 62 carried thereby come into play and tend to fluff the hairy pelt and during both the ironing and beating operation the blanket 106 insures that a good arc of contact is maintained between the pelt and the heating and beating drum.

During the brushing and heating and beating operation the air is being exhausted from the casing 126 so as to withdraw any dust or foreign matter brushed from the pelt. During this operation the flexible member 132 of Fig. 5, or 132$^a$ of Fig. 5$^b$ coacts with the drum to prevent loss of suction.

The finished pelt falls upon the apron 216 and is manually removed therefrom and transferred to a suitable storage point.

By rocking the shaft 118 and the arms 116 carried thereby it is apparent that the arc of contact between the fur pelt and the ironing drum 60 can be varied at will. This permits of varying the kind of finish applied to the pelt. By having a long arc of contact the pelt is subjected to heating and beating for a longer period than is the case when a comparatively short arc of contact is maintained. This permits of adjusting the machine to suit the requirements of fur pelts of different animals or different grades of pelts from the same animals. The adjustable mountings for the feed rollers 32 and 34 provide for treating pelts of different relative thicknesses.

While we have described with great particularity the construction of an embodiment of the invention herein illustrated it is not to be construed that we are limited thereto since various modifications and substitutions of equvalents may be made without departing from the invention as defined in the appended claims.

What we claim is:

1. In a machine for treating furs, feed rollers, a brush and a combined heater and beater arranged to engage the fur after it has been acted upon by said brush.

2. In a machine for treating furs, a combined heater and beater comprising a substantially cylindrical rotary drum having a heating unit therin and beaters carried by said drum.

3. A machine for treating furs comprising feed rollers, a rotary brush, a heated drum, means for distributing jets of vapor over the fur and means for applying heat and pressure to the fur after it has been brushed and subjected to said jets of vapor.

4. A machine for treating furs including vaporizing means comprising a liquid supply, a coil connected with said liquid supply, a heater and a blower associated with said coil, and means connected with said coil for distributing vapor over the fur.

5. A machine for treating furs including vaporizing means comprising a liquid supply, a coil connected with said liquid supply, a heater and a blower associated with said coil and adjustable means for distributing vapor over varying areas of the fur.

6. A machine for treating furs including vaporizing means comprising a liquid supply, a coil connected with said liquid supply, a heater and a blower associated with said coil and an adjustable vapor distributor comprising a tubular member having a row of outlet orifices and means for progressively uncovering or covering said orifices.

7. A machine for treating furs comprising a rotary brush, a combined heater and beater, a pair of coacting feed rollers, a bearing movable toward and from the brush supporting one of said feed rollers and a feed table connected to and movable with said bearing.

8. In a machine for treating furs, a substantially cylindrical drum having a heating unit therein, beaters secured to said drum, a casing for the drum, means for exhausting air from said casing and yielding means closing a space between a portion of said casing and said drum.

9. In a machine for treating furs, a substantially cylindrical drum having a heating unit therein, beaters secured to said drum, a casing for the drum, an exhaust fan connected with said casing and a yielding member secured to said casing adapted to close the space between the casing and the drum.

In witness whereof, we have hereunto signed our names.

PAUL P. RUHE.
WILLIAM A. SONEN.